United States Patent [19]

Steadman

[11] Patent Number: 4,736,418
[45] Date of Patent: Apr. 5, 1988

[54] SOFT COVER FOR TELEPHONE

[76] Inventor: Diana M. Steadman, 3170 E. Ojai Ave., Ojai, Calif. 93023

[21] Appl. No.: 944,991

[22] Filed: Dec. 22, 1986

[51] Int. Cl.4 ........................ H04M 1/03; H04M 1/17
[52] U.S. Cl. .................... 379/451; 379/433; 379/440; 379/447; 379/452
[58] Field of Search .............. 379/437, 440, 451, 452, 379/453, 447, 450

[56] References Cited

U.S. PATENT DOCUMENTS

| | | | |
|---|---|---|---|
| D. 214,322 | 6/1969 | Velasquez | 379/451 |
| 836,674 | 11/1906 | Frank | 379/452 |
| 1,340,863 | 5/1920 | Knight | 379/453 |
| 2,050,097 | 8/1936 | Kalenoff | 379/451 |
| 2,475,303 | 7/1949 | Allen et al. | 379/450 |
| 2,489,425 | 11/1949 | Levitt | 379/440 |
| 2,544,267 | 3/1951 | Konvalinka | 379/447 |
| 2,554,081 | 5/1951 | Allen et al. | 379/447 |
| 2,575,280 | 11/1951 | Long | 379/451 |
| 3,012,108 | 12/1961 | Bett | 379/447 |
| 3,962,555 | 6/1976 | Efaw | 379/419 |
| 4,154,990 | 5/1979 | Gumb | 379/436 |
| 4,355,777 | 10/1982 | Greenstreet | 248/346 |
| 4,546,217 | 10/1985 | Frehn | 379/452 |
| 4,582,966 | 4/1986 | Sutton et al. | 379/452 |

FOREIGN PATENT DOCUMENTS

| | | | |
|---|---|---|---|
| 431769 | 7/1926 | Fed. Rep. of Germany | 379/452 |
| 3516290 | 11/1986 | Fed. Rep. of Germany | 379/440 |
| 755426 | 11/1933 | France | 379/452 |
| 1541794 | 10/1968 | France | 379/433 |
| 458852 | 3/1935 | United Kingdom | 379/439 |

*Primary Examiner*—Jin F. Ng
*Assistant Examiner*—Danita R. Byrd
*Attorney, Agent, or Firm*—Marvin E. Jacobs

[57] ABSTRACT

A removable, washable cover for a telephone handset comprises an outer fabric cover, suitably cotton, and an inner cushioning layer also preferably cotton having a cavity for receiving a telephone handset. An elongated opening is provided along the rear or front panels of the cover and cushioning layer. The edges of the cover along the opening are provided with cooperative fastening materials such as two strips of VELCRO.

10 Claims, 1 Drawing Sheet

SOFT COVER FOR TELEPHONE

BACKGROUND OF THE INVENTION

This invention relates to telephones and is particularly directed to soft and resilient covers for telephone handsets. The covers provide comfort to the hand and ear of the user and are decorative and attractive. The cover can readily be removed for washing or replacement as the room is redecorated or the phone moved to another room.

PRIOR ART

Telephone cases have traditionally been formed of hard, rigid materials such as metal, plastic or the like. These telephones have been uncomfortable to hold for extended periods, especially when one desired to talk on the telephone and, simultaneously, to write notes or perform some other function with one's hands. Furthermore, if these hard telephones were dropped, they could crack, break and/or cause unsightly gouges in fine wood furniture. Moreover, where sanitation is a matter of concern, such as in hospitals, it has been inconvenient and difficult to clean and sterilize these telephones. Finally, the colors of hard telephones are usually molded into the material of the telephone and cannot be changed. Also, the range of colors and patterns available for plastic telephones has been extremely limited.

DESCRIPTION OF THE PRIOR ART

One or two piece removable covers for telephone handsets have been proposed for a variety of purposes. Typical of these covers are the U.S. patents listed below:

U.S. Pat. No. 3,962,555; issued June 8, 1976 to Dale E. Efaw

U.S. Pat. No. 2,554,081; issued May 22, 1951 to C. H. Allen

U.S. Pat. No. 2,475,303; issued July 5, 1949 to C. H. Allen

U.S. Pat. No. 2,489,425; issued Nov. 29, 1949 to A. Levitt

However, in every instance, the proposed covers have also been formed of hard material. While these covers may permit some variation in the color and pattern of the telephone handsets, the variety is extremely limited and they solve few, if any, of the other problems mentioned above. Some degree of sepsis is possible with the cover of Efaw which includes replaceable cotton gauze filter. No cushioning is possible since the filter is housed in a hard case. Konvalinka in U.S. Pat. No. 2,544,267 discloses ear cushioning in the form of a convex, dome-shaped sponge rubber piece attachable to an earpiece. Ahrens (U.S. Pat. No. D255,445 surrounds the telephone base unit with a stuffed animal.

BRIEF STATEMENT OF THE INVENTION

In accordance with the present invention, a removable cover for telephone handsets is provided which is formed of soft, washable or cleanable material such as fabric or other soft, resilient material. The outer cover may be attached to or surround a resilient lining of stuffing of cotton, foam rubber or the like to provide a soft, resilient and protective composite cover for a telephone handset. The cover is provided with closure means which can be opened to remove the cover for washing or sterilization or redecoration.

These and many other features and attendant advantages of the present invention will be apparent as the invention becomes better understood by reference to the following detailed description when considered in conjunction with the accompanying drawing.

DETAILED DESCRIPTION OF INVENTION

Figure 2:
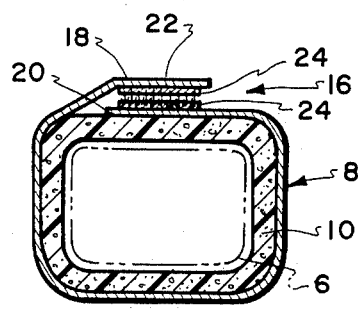
FIG. 2 is a transverse section through the handset of FIG. 1 taken on the line 2—2 thereof.
Figure 1:
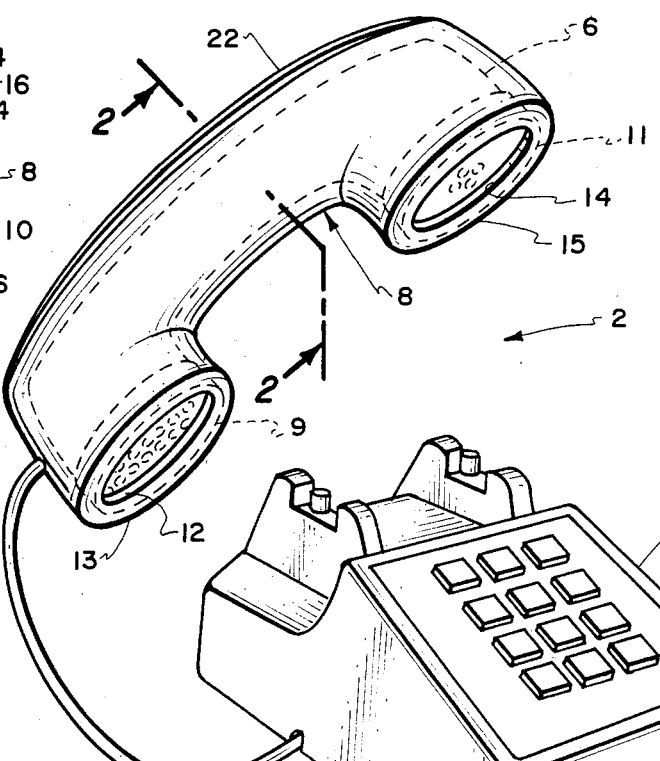
FIG. 1 is a schematic view of a telephone with a cover according to the present invention installed on the handset--the handset being shown in phantom.

In that form of the present invention chosen for purposes of illustration in FIG. 1, a telephone is shown, indicated generally at 2, having a base unit 4 and a handset, shown in phantom at 6. The telephone handset may be formed in substantially any desired shape and may be formed of any conventional material. The handset, as shown, is the traditional handset with a generally triangular shaped stem joining a rounded mouthpiece 9 and earpiece 11.

However, in order to overcome the disadvantages of prior art telephones, as discussed above, a cover 8 is provided for the handset 6 formed of soft, resilient material, such as fabric, plastic, leather or the like. Moreover, if desired, the cover may be provided with cushioning material, such as a layer 10 of cotton batting, polyurethane foam, foam rubber or the like. The cover 8 contains a cavity formed to closely overlie the handset 6 and can be provided with openings 12 and 14 in front of the mouthpiece cover 13 and earpiece cover 15 so as not to interfere with sound transmission to or from the handset. Alternatively, the fabric cover can extend over the mouthpiece and earpiece covers 13, 15 and be provided with perforations so that sound waves can reach the sound transducers without undue interference.

Figure 3:
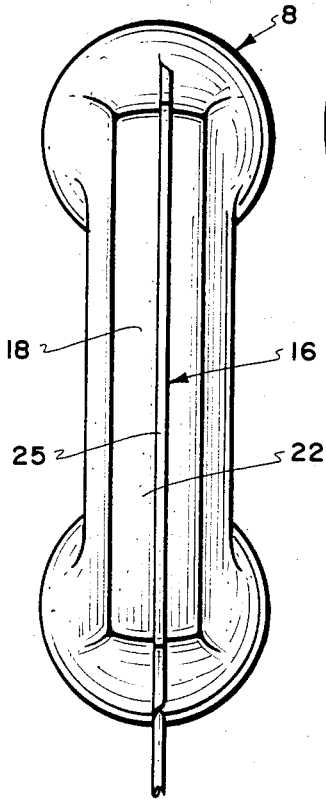
FIG. 3 is a rear view of the handset of FIG. 1 showing the closure means for the cover.

As best seen in FIG. 3, the cover 8 is formed with an opening 16 in the rear surface 18 thereof. Suitable releaseable closure means are provided along the edges 20, 22 of the opening 16 in the rear surface to permit the cover 8 to be removed from the handset 6 to permit cleaning or sterilization of the cover 8. The edges 20 and 22 of the opening 16 are formed to overlap and suitable cooperative closure means, such as releaseable, touch fastening "Velcro" closure strips 24, are provided on the facing surfaces of the edges 20 and 22 to permit the cover 8 to be releaseably secured on the handset 6. It will also be apparent to those skilled in the art that other forms of closure means, such as hooks, snaps, zippers or the like may be substituted for the strips 24. The opening can contain an overlapped welted seam 25 to provide an attractive finish to the closure means and increased comfort to the user.

Figure 5:
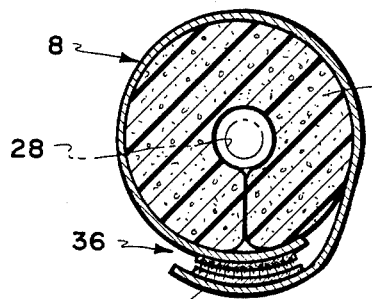
FIG. 5 is a transverse section through the handset of FIG. 4 taken on the line 5—5 thereof.
Figure 4:
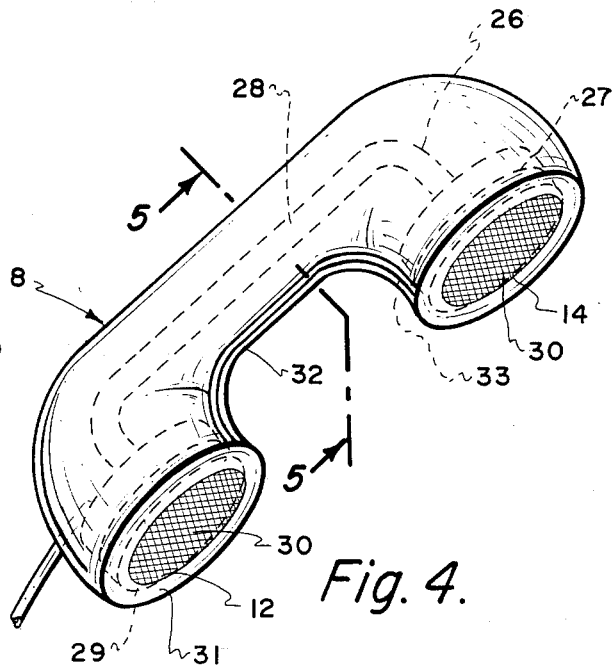
FIG. 4 is a diagrammatic view of an alternative form of telephone handset employing a cover embodying the present invention.

FIG. 4 shows an alternative form of handset 26 in which the central portion 28 of the handset has been reduced to a thickness, just sufficient to house the cables connecting the mouthpiece to the earpiece. This permits the thickness of the layer 10 of cushioning material to be greatly increased to provide increased comfort for the user, and/or to reduce the overall profile of the handset. Also, as seen in FIG. 4, a thin layer of material 30, may be provided over the openings 12 and 14 to provide protection for the speaker and earpiece of the handset 26. However, when this is done, it is preferred that only an annular ring 29, 27 of the cushioning layer 10 is provided in front of the mouthpiece 31 and earpiece 33. These rings 29, 27 displace the cover material 30 from the surfaces of the mouth and ear pieces 31, 33 which minimizes interference with the sound transmission to or from the handset 26. In this embodiment, the opening 36, which permits the handset 26 to be inserted into or removed from the cover 8 is located on the underside of the cover 8, as seen at 32 in FIGS. 4 and 5.

It will be apparent that the cover can be formed of substantially any suitable material, either natural fabrics such as cotton or silk or wool or synthetics such as nylon or polyester or even fur-like materials. Moreover, many different stuffing materials may be used for the cushioning layer 10 such as cotton or foam.

In the model in which the handset is reduced to a minimum size to house the wiring etc., the soft inner stuffing layer could be thicker to fill out the shape. Rather than moving the covering of the handset to gain access to the wiring, access could be via the annular ring. The round parts at either end would also be reduced and filled with stuffing to maintain the shape of the receiver. The end caps could have external threads and received in internally threaded ends of the handset. The caps would unscrew to allow access. The ends would be finished, i.e., closed with material so the cushoning material would not fall out and when screwed into the central portion of the handset would join smoothly to feel and fit like one continuous piece. This embodiment could also have the outer removable light cover with a seam with Velcro or other fasteners. Also the base of the phones could be soft and matching the receivers. The dialing mechanism could be either on the base as in the older, traditional phone design or can be provided on the handset as in most modern phones.

It is to be understood that these and other modifications, variations, etc. may be made without departing from the present invention. Accordingly, it should be clearly understood that the forms of the present invention described above and shown in the accompanying drawing are illustrative only and are not intended to limit the scope of the present invention.

I claim:

1. A removable, washable cover for a telephone handset having a hard case housing a mouthpiece and earpiece connected by a stem comprising:
   a soft, washable, fabric cover having an inner layer of a soft, resilient, cusioning material having a cavity formed to overlie said telephone handset,
   said cover being formed of a continuous sheet of fabric material having a mouthpiece enclosing portion and earpiece enclosing portion joined by a stem enclosing section, said cover having an elongated opening with a set of facing edges formed in the stem enclosing section of said cover, a set of releasable, cooperative fastening means formed on said facing edges to permit insertion and removal of said handset from said cover.

2. A telephone handset cover of claim 1 in which said cover cover is formed of a woven fabric material.

3. A telephone handset cover according to claim 1 in which the cushioning material has a cavity substantially in the shape of the handset.

4. A telephone handset cover of claim 1 in which said opening extends from said stem section partially into said mouthpiece enclosing portion and partially into said earpiece enclosing portion.

5. A telephone handset cover of claim 4 wherein:
   said opening is an elongated opening formed in a rear surface of said cover parallel to a longitudinal axis of the handset.

6. A telephone handset cover of claim 4 wherein:
   said opening is formed on an underside of said cover.

7. A telephone handset cover of claim 1 further comprising:
   openings formed in said cover in a position overlying the mouthpiece and earpiece of said handset.

8. A handset according to claim 1 in which the cushioning means overlies a front edge portion of the mouthpiece and earpiece of the handset in the form of an annular ring.

9. A handset according to claim 1 in which the set of cooperative fastening means comprises two strips of "Velcro" secured to said edges.

10. A handset according to claim 2 in which the cover and cushioning material are formed of cotton.

* * * * *